United States Patent [19]
Davis

[11] 4,205,945
[45] Jun. 3, 1980

[54] UNITIZED FLUID DELIVERY SYSTEM AND METHOD OF OPERATING SAME

[75] Inventor: Donald Y. Davis, Cincinnati, Ohio

[73] Assignee: General Electric Company, Cincinnati, Ohio

[21] Appl. No.: 634,452

[22] Filed: Nov. 24, 1975

Related U.S. Application Data

[63] Continuation of Ser. No. 528,275, Nov. 29, 1974, abandoned.

[51] Int. Cl.² ............... F04B 49/00; F04B 23/14
[52] U.S. Cl. ........................... 417/53; 417/202; 417/245; 417/323; 417/237; 417/223
[58] Field of Search ............ 417/199 A, 202, 203, 417/205, 245, 250, 523, 324, 374, 223, 15, 237, 53; 60/408; 123/179 F

[56] References Cited

U.S. PATENT DOCUMENTS

| | | | |
|---|---|---|---|
| 1,083,568 | 1/1914 | Ungar | 417/324 |
| 1,255,273 | 2/1918 | Battin | 417/237 |
| 1,982,841 | 12/1934 | Tamuni | 417/199 A |
| 2,003,456 | 6/1935 | Nardone | 417/223 |
| 2,467,398 | 4/1949 | Miller | 417/374 |
| 2,475,316 | 7/1949 | Garraway | 417/245 |
| 2,679,206 | 5/1954 | Huber | 417/245 |
| 2,838,908 | 6/1958 | Forster | 417/324 |
| 3,431,857 | 3/1969 | Jenning et al. | 417/237 |
| 3,851,998 | 12/1974 | Downing | 417/199 A |

Primary Examiner—Richard E. Gluck
Attorney, Agent, or Firm—Robert C. Lampe, Jr.; Henry J. Policinski; Derek P. Lawrence

[57] ABSTRACT

A centrifugal boost pump, a primary centrifugal pump and a dynamic machine are driven through a common drive shaft. At low speeds, such as during pump start-up, the elements are in the aforementioned fluid serial relationship such that the dynamic machine, functioning as a pump, provides the primary fluid pressurization. Once a predetermined primary pump discharge pressure is attained, a clutch disengages the centrifugal boost pump and dynamic machine from the primary centrifugal pump, and the discharge of the dynamic machine is routed to a low pressure source. Thereafter, primary fluid pressurization is accomplished by the primary centrifugal pump which also pumps fluid through the dynamic machine, now functioning as a motor and driving the centrifugal boost pump.

12 Claims, 1 Drawing Figure

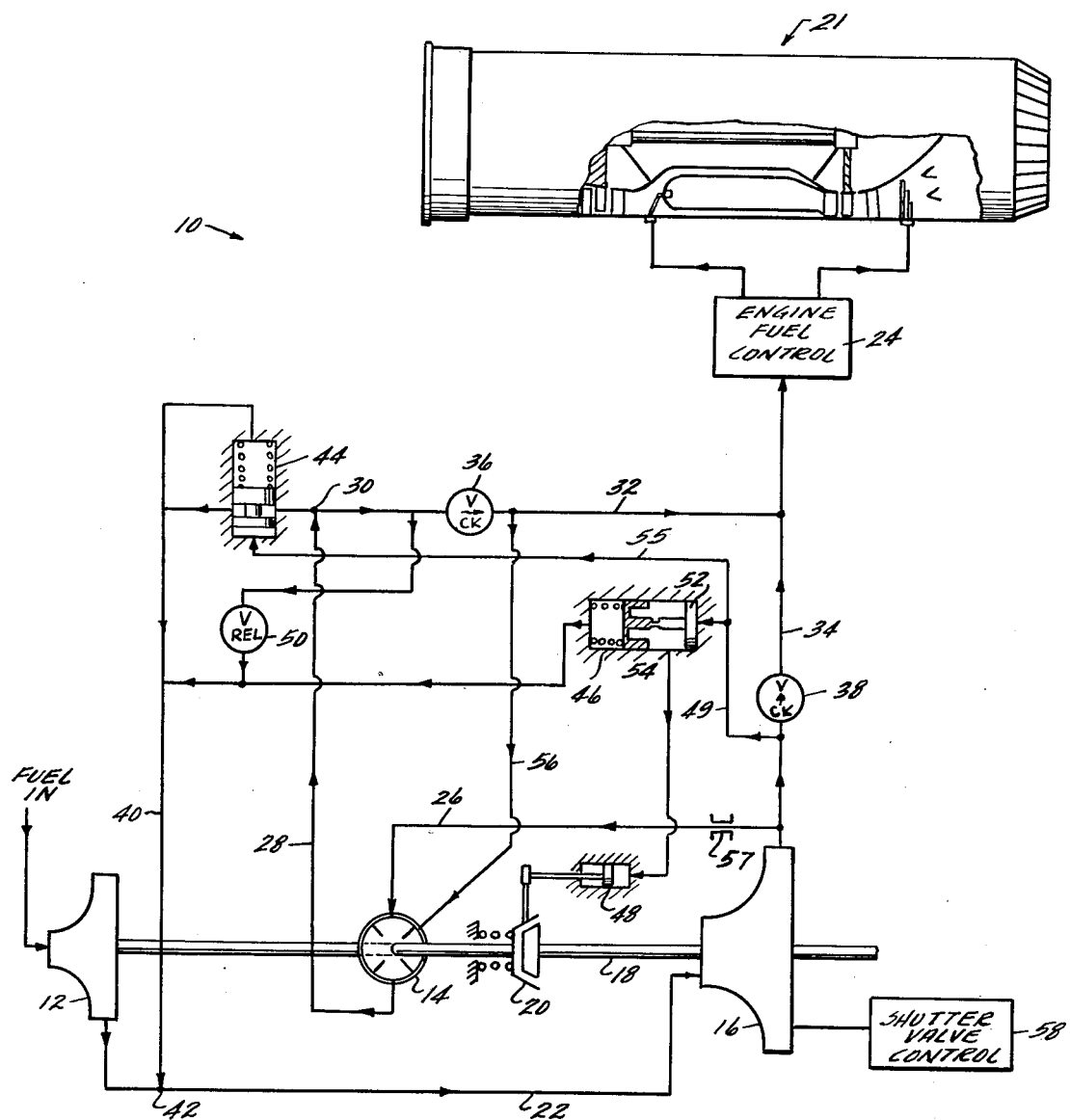

UNITIZED FLUID DELIVERY SYSTEM AND METHOD OF OPERATING SAME

The invention herein described was made in the course of or under a contract or subcontract thereunder (or grant) with the Department of the Navy.

This is a continuation of application Ser. No. 528,275, filed Nov. 29, 1974, now abandoned.

BACKGROUND OF THE INVENTION

This invention relates to fluid delivery systems which include centrifugal pumps and, more particularly, to an integrated pumping system comprising multiple pumping elements which are adaptable over a large range of fluid flow rates.

Many fluid delivery systems require a very large flow range with high pump head rise and low pump temperature rise throughout the flow range. For example, current afterburning gas turbojet engines require significantly higher fuel delivery rates while operating in the augmented (or afterburning) mode than when operating in the non-augmented mode. The initial problem facing fuel delivery system designers, therefore, was to provide a single pump which would operate over the entire flow range with minimum fuel temperature rise from the delivery system. The minimum fuel temperature rise requirement was easily attained at high flow rates because of the short dwell time in the system. However, the low temperature rise requirement at low pump flow rates was more difficult to attain. A centrifugal pump having a variable diffuser which utilizes a slotted shutter valve to selectively close off diffuser vane entry passages, as the fuel rate of the pump is decreased, has been shown to substantially improve the desired flow range and low speed temperature rise characteristics. Such a pump is described and claimed in U.S. Pat. No. 3,784,318, by the present inventor and assigned to the assignee of the present invention. A simple means for controlling the position of the shutter valve is described and claimed in U.S. Pat. No. 3,826,586, J. C. Richards, and is also assigned to the assignee of the present invention.

While the shuttered diffuser centrifugal pump has proven successful, it has been unable to provide sufficient pressure rise at low pump speeds such as encountered while starting a gas turbine engine. Since pressure rise of a centrifugal pump is essentially proportional to the pump speed squared, it becomes apparent that the pressure rise of a pump operating in the starting speed range (10% to 40% of design speed) is relatively insignificant. Accordingly, it is the custom to incorporate a displacement type of pump (vane, gear, piston, etc.) for use in the starting and unaugmented engine operating modes, and a centrifugal pump for use in supplying the high augmentation flow rates, since the displacement pump is capable of providing adequate fuel pump pressure at low engine speeds. Furthermore, efficient centrifugal pumps operating at high rotational speeds require preboosting of the working fluid to prevent cavitation within the pump.

Attempts to unitize the fluid delivery system by combining a displacement type starting and low flow rate element, an inlet boost element and a centrifugal (or displacement) high flow element have generally resulted in complicated, large, heavy packages which are undesirable for aircraft engine applications.

SUMMARY OF THE INVENTION

A principal object of the present invention, therefore, is to provide a lightweight, unitized fluid delivery system capable of operating over a large range of fluid delivery rates, including low flow rates with high delivery pressures utilizing extremely low pump rotational speeds.

Another object of the present invention is to provide an improved method of delivering fluid from a fluid source to a fluid-using system.

These and other objects and advantages will be more clearly understood from the following detailed description, the drawing and specific examples, all of which are intended to be typical of rather than in any way limiting to the scope of the present invention.

Briefly stated, the above and other related objects are provided by driving a centrifugal boost pump, a primary centrifugal pump and a dynamic machine through a common drive shaft. At starting speeds, the elements are in the aforementioned fluid serial flow relationship such that the dynamic machine, functioning as a pump, provides the primary fluid pressurization. Once a predetermined primary pump discharge pressure is attained, a clutch disengages the centrifugal boost pump and dynamic machine from the primary centrifugal pump. Essentially simultaneously, the discharge of the dynamic machine is routed to a low pressure source. Thereafter, primary fluid pressurization is accomplished by the primary centrifugal pump which also pumps fluid through the dynamic machine, now functioning as a motor and driving the centrifugal boost pump. The result is an efficient, unitized fluid delivery system for use over a large fluid flow rate range and capable of providing high discharge pressure at low driving speeds. Although this invention is directed to aircraft fuel delivery systems by way of example, it will become apparent that the invention is equally applicable to all devices requiring very wide fluid flow ranges and low speed, high pressure delivery operation.

DESCRIPTION OF THE DRAWING

The FIGURE is a schematic representation of a fluid delivery system incorporating the subject invention.

DESCRIPTION OF THE PREFERRED EMBODIMENT

Reference is directed to the FIGURE wherein a fluid delivery system depicted generally at 10 and embodying the present invention is schematically shown. This fluid delivery system is shown to include a boosting means 12 (such as a centrifugal boost pump), a dynamic machine 14 and primary fluid pumping means 16 (such as a centrifugal pump) drivingly connected to drive shaft 18 which, in turn, is operatively connected to some drive means such as a gearbox drive assembly (not shown). The term "dynamic machine" as used herein denotes a machine in which energy transfer is effected through direct interaction between the flow and a rotating machine element, including positive displacement machines. A clutch 20 is disposed upon drive shaft 18 and serves to couple the drive shaft to the dynamic machine 14 and, therefore, to the centrifugal boost pump 12 at drive shaft speeds below which the primary centrifugal pump 16 can provide adequate pressure to a fluid-using system such as a fuel control 24 of a gas turbine engine depicted generally at 21. The clutch 20 is adjusted to be disengaged by the primary centrifugal pump discharge pressure when the primary pump 16 provides the necessary fluid delivery system pressure in a manner hereinafter described.

Dynamic machine 14 functions as a pump during low speed operation of drive shaft 18, which can occur in a first operational mode characteristic of the starting of a gas turbine engine, and also functions as a motor during high speed operation of drive shaft 18 when primary centrifugal pump 16 provides adequate pressure for the fluid using system. This dynamic machine is driven by the drive shaft 18 through clutch 20 during low speed operation.

Main centrifugal pump 16 provides fluid flow at drive shaft speeds great enough to generate the required fluid using system pressure. It also signals clutch 20 to engage or disengage and re-references the output of the dynamic machine 14 in a manner hereinafter discussed.

Centrifugal boost pump 12 and primary centrifugal pump 16 are fluidly connected in serial flow relationship by passage 22 with fluid initially entering boost pump 12 as shown. The output of the primary centrifugal pump 16 is fluidly connected to the fluid-using system 24 through two fluid circuits. The first fluid circuit comprises passage 26 between the output of the primary centrifugal pump 16 and dynamic machine 14, passage 28 between the dynamic machine 14 and junction 30, and passage 32 between junction 30 and engine fuel control 24. The second fluid circuit comprises passage 34 which directly connects the output of the primary centrifugal pump 16 and control 24. First and second valves, such as check valves 36 and 38, respectively, are disposed within passages 32 and 34, respectively, for the purpose of maintaining proper fluid flow direction as indicated by the flow vectors.

A third fluid circuit of significance is disposed between the output of dynamic machine 14 and some region which is at a pressure lower than the output pressure of primary centrifugal pump 16 during high speed operation. This circuit is represented by passage 28, hereinbefore described, and passage 40 between junction 30 and junction 42, based on the selection of the input to the primary centrifugal pump 16 as the low pressure region. However, it should be understood that any other suitable low pressure region could function equally well, the object being to provide a pressure differential across dynamic machine 14. A third valve denominated as the dynamic machine discharge valve 44 is disposed within passage 40 and serves to fluidly open or close the passage 40 upon receipt of a predetermined pressure signal in a manner to be discussed.

Control means 46 serve to engage or disengage clutch 20 through actuator 48 in response to the pressure output of the primary centrifugal pump 16 received through passage 49.

In operation, at very low shaft speeds (such as during start-up) the fluid delivery system can be construed as being in a first operating mode. During this mode it can be appreciated that the pressure output of the primary centrifugal pump is very low. For example, since the pressure delivery is a function of pump rotational speed squared, if the pump is rotating at 10% of its design speed its pressure output is only 1% of its design value, an insignificant pressure rise and insufficient to sustain, for example, the normal operation of a gas turbine engine. Accordingly, dynamic machine 14 is maintained in an engaged relationship with primary centrifugal pump 16 and shaft 18 through clutch 20. Operating as a pump, the dynamic machine 14 does necessary work upon the fluid causing it to flow through the first fluid circuit comprising passages 26, 28 and 32 to the fuel control 24. Since the fluid pressure exiting "pump" 14 exceeds that of the primary centrifugal pump 16 discharge, check valve 36 is forced open and check valve 38 is forced closed, thereby precluding back-flow into the primary centrifugal pump 16 discharge. The proper pressure level is maintained at "pump" 14 discharge by means of discharge pressurization valve 50 which provides a bleed path to primary centrifugal pump 16 inlet via passage 40 in the event the pressure exceeds a predetermined level.

As the system shaft speed increases, the output pressure of the primary centrifugal pump 16 increases. At a preselected condition such as a predetermined pressure level, piston 52 within control 46 is forced to the left in the FIGURE, thus exposing port 54 to the primary centrifugal pump 16 discharge pressure. This, in turn, sequences actuator 48 to disengage clutch 20. Contemporaneously, the primary centrifugal pump discharge pressure signals valve 44 through passage 55 and causes valve 44 to open, thereby venting the discharge of dynamic machine 14 to the low pressure inlet of pump 16 through the aforementioned third fluid circuit. Since a pressure differential now exists across dynamic machine 14, it functions as a motor extracting energy from the fluid and driving energy-using means or boost pump 12 which, in turn, pre-boosts the fluid entering pump 16 to prevent cavitation therein. The "motor" 14 supply flow is regulated by restriction 57 to maintain boost pump drive speed at a value chosen for best performance. Additionally, check valve 38 is forced open providing a direct fluid path to control 24, and check valve 36 is forced closed. This comprises the second operational mode of the fluid delivery system.

Passage 56 provides pressurization to the underside of the vanes in the dynamic machine 14 when the dynamic machine comprises a vane pump in the manner well known in the art. Furthermore, shutter valve 58 is provided to selectively modulate the flow within the diffuser vane passage of the primary centrifugal pump 16 as taught by the previously cited patents to Richards and the present inventor.

It should be obvious to one skilled in the art that certain changes can be made to the above-described invention without departing from the broad inventive concepts thereof. For example, the packaging of the above-described system may be accomplished in numerous ways without departing from the aforementioned concepts. Further, in certain applications where pump temperature rise is of small importance, shutter valve 58 may be eliminated. And, as previously discussed, the present invention is not limited to application in gas turbine engines but is equally applicable wherever there is a requirement for centrifugal pumps for use over a large range of fluid flow rates. It is intended that the appended claims cover these and all similar variations of the present invention's broader inventive concepts.

What is claimed is:

1. A fluid delivery system for use over a large range of fluid flow rates, said fluid delivery system including:
   primary fluid pumping means;
   fluid boosting means;
   means to introduce a fluid into the boosting means;
   first passage means fluidly connecting said boosting means and said primary pumping means;
   second passage means fluidly connecting said primary pumping means and a fluid-using system;

a dynamic machine which functions as a pump during a first operational mode when the output pressure of said primary fluid pumping means is less than a predetermined pressure, and which functions as a motor for driving said boosting means during a second operational mode when the output pressure of said primary pumping means is at least equal to said predetermined pressure;

third passage means adapted to fluidly connect in serial flow relationship said primary pumping means, said dynamic machine and said fluid-using system;

fourth passage means adapted to fluidly connect in serial flow relationship said dynamic machine and a region having a pressure lower than the inlet pressure of fluid to said dynamic machine from said primary pumping means;

means to fluidly interrupt said fourth passage means during said first operational mode, and to fluidly connect said fourth passage means during said second operational mode;

clutch means;

rotatable shaft means operatively connecting said primary fluid pumping means through said clutch means to said boosting means and said dynamic machine; and means to operatively engage said clutch means during said first operational mode, thereby permitting said shaft means to drive said boosting means and said dynamic machine, and to operatively disengage said clutch means during said second operational mode.

2. The fluid delivery system of claim 1 further including first valve means disposed within said second passage means to substantially preclude fluid flow therethrough during said first operational mode.

3. The fluid delivery system of claim 2 further including second valve means disposed within said third passage means between the dynamic machine and the fluid using system to substantially preclude fluid flow therethrough during said second operational mode.

4. The fluid delivery system of claim 1 wherein said primary fluid pumping means and said boosting means each comprise a centrifugal-type pump.

5. The fluid delivery system of claim 3 further including control means operatively connected with said clutch means and fluidly connected with said primary pumping means, said control means being adapted to regulate the engagement of said clutch means as a function of said primary pumping means discharge pressure.

6. The fluid delivery system of claim 5 wherein said fluid-using system comprises an engine.

7. The fluid delivery system of claim 5 wherein said means to interrupt and connect said fourth passage means during said first and said second operational mode, respectively, comprises third valve means.

8. The fluid delivery system of claim 1 wherein said region having a lower pressure than the inlet to said dynamic machine comprises the inlet to said primary pumping means.

9. The fluid delivery system of claim 5 wherein said first valve means and said second valve means are check valves.

10. In a method of delivering fluid from a fluid source to a fluid-using system, the steps of:

initially pressurizing said fluid in a fluid-boosting means;

further pressurizing said fluid in a primary fluid-pumping means;

passing said fluid to a dynamic machine which is adapted to function as a pump for still further pressurization thereof prior to delivery to the fluid-using system when the output pressure of said primary fluid-pumping means is less than a predetermined pressure; and passing a first portion of said fluid from said primary fluid-pumping means to the fluid-using system, and passing a second portion of said fluid from said primary fluid-pumping means to said dynamic machine adapted to function as a motor for driving said fluid-boosting means when the output pressure of said primary fluid-pumping means is at least equal to said predetermined pressure.

11. The method of claim 10 including the further steps of:

driving said fluid boosting means, said primary fluid-pumping means and said dynamic machine through a rotatable shaft means; and mechanically disengaging said dynamic machine and said fluid-boosting means from said primary fluid-pumping means when the output pressure of said primary fluid-pumping means is at least equal to said predetermined pressure.

12. The method of claim 11 further including the step of:

passing said second fluid portion from said dynamic machine to a region having a pressure lower than the inlet pressure of fluid to said dynamic machine substantially simultaneous with mechanical disengagement of said dynamic machine and said fluid-boosting means from said primary fluid-pumping means.

* * * * *